US010512144B1

(12) United States Patent
Shen

(10) Patent No.: US 10,512,144 B1
(45) Date of Patent: Dec. 17, 2019

(54) RADIO FREQUENCY-BASED RGB LAMP STRIP CONTROLLER AND POWER PLUG

(71) Applicant: NINGBO GOLDEN POWER ELECTRONIC CO., LTD., Ningbo (CN)

(72) Inventor: Zhengxian Shen, Ningbo (CN)

(*) Notice: Subject to any disclaimer, the term of this patent is extended or adjusted under 35 U.S.C. 154(b) by 0 days.

(21) Appl. No.: 16/353,189

(22) Filed: Mar. 14, 2019

(30) Foreign Application Priority Data

Nov. 23, 2018 (CN) .................. 2018 2 1940409 U

(51) Int. Cl.
*H05B 37/02* (2006.01)
*H05B 33/08* (2006.01)

(52) U.S. Cl.
CPC ..... *H05B 37/0272* (2013.01); *H05B 33/0857* (2013.01)

(58) Field of Classification Search
CPC .. H05B 33/08; H05B 33/0857; H05B 33/086; H05B 33/0742; H05B 33/0812; H05B 37/02; H05B 37/0272; H05B 37/0245
See application file for complete search history.

(56) References Cited

U.S. PATENT DOCUMENTS

| | | | |
|---|---|---|---|
| 8,253,342 B2* | 8/2012 | Ku ..................... | H05B 33/0827 315/185 R |
| 9,232,613 B2* | 1/2016 | Ebihara .............. | H05B 37/0272 |
| 2013/0249394 A1* | 9/2013 | Fay ..................... | B60Q 1/0088 315/77 |
| 2017/0352506 A1* | 12/2017 | Dimberg ............... | G08C 17/02 |

* cited by examiner

*Primary Examiner* — Thai Pham
(74) *Attorney, Agent, or Firm* — W&K IP

(57) ABSTRACT

The present disclosure relates to a radio frequency-based RGB lamp strip controller and a power plug, comprising an input module coupled to the input end for adjusting a power voltage and supplying power to the controller and the lamp strip; a radio frequency receiving module electrically connected to the input module for receiving a radio frequency signal sent by a radio frequency terminal; a control module electrically connected to the input module and the radio frequency receiving module for receiving the radio frequency signal to output a control signal; and a color adjustment module electrically connected to the input module, the control module, and the lamp strip, for adjusting a flicker color and a flicker frequency of the lamp strip according to the control signal.

11 Claims, 3 Drawing Sheets

RADIO FREQUENCY-BASED RGB LAMP STRIP CONTROLLER AND POWER PLUG

CROSS-REFERENCE TO RELATED APPLICATIONS

This application claims priority to Chinese Patent Application No. 201821940409.1 with a filing date of Nov. 23, 2018. The content of the aforementioned application, including any intervening amendments thereto, are incorporated herein by reference.

TECHNICAL FIELD

The present disclosure relates to the field of controllers and more particularly to a radio frequency (RF)-based RGB lamp strip controller and power plug.

BACKGROUND

In recent years, lighting equipment for LED light sources has been greatly increased. Correspondingly, more controllers become available for LED strips. However, in practical applications, it is difficult for the user to accurately manipulate a controller within a relatively long distance (for example, within a range of ten meters) to change the illumination mode of the LED strip. Therefore, providing a radio frequency-based controller for RGB strips has become one problem to be solved.

SUMMARY

An embodiment of the present disclosure discloses a radio frequency-based RGB lamp strip controller comprising an input module coupled to the input end for adjusting a power voltage and supplying power to the controller and the lamp strip; a radio frequency receiving module electrically connected to the input module for receiving a radio frequency signal sent by a radio frequency terminal; a control module electrically connected to the input module and the radio frequency receiving module for receiving the radio frequency signal to output a control signal; and a color adjustment module electrically connected to the input module, the control module, and the lamp strip, for adjusting a flicker color and a flicker frequency of the lamp strip according to the control signal. The controller controls the lamp strip by means of radio frequency, and the user can switch between seven monochrome modes and eight colored modes of the lamp strip through a radio frequency terminal. The color adjustment module is a MOS transistor Q1. The control module is a single-chip U1 connected to the input module and the radio frequency receiving module. The gate of the MOS transistor Q1 is connected with a signal output pin of the single-chip U1. A source of the MOS transistor Q1 is coupled to the input module, and a drain of the MOS transistor Q1 is coupled to the lamp strip as an output terminal. In the controller, the radio frequency receiving module receives radio frequency signals from the outside world, and the user can directly control the controller through a corresponding radio frequency terminal device to take control of color of the lamp strip wirelessly.

In an embodiment, the input module comprises a serially connected reverse protection unit and a voltage stabilizing unit. A gate of the MOS transistor Q1 passes through a resistor R6 to connect to an output terminal of the reverse protection unit, and an output terminal of the voltage stabilizing unit is connected to a drain of the MOS transistor Q1. This connection approach can lower the input voltage when the power supply is reversely connected, and protect both the controller and the lamp strip. The safety and reliability of the controller can be improved.

In an embodiment, the reverse protection circuit is connected in parallel with a diode D1 and a capacitor C1. An anode of the diode D1 is grounded, and a cathode of the diode D1 is connected to the power source and the voltage stabilizing unit. The voltage stabilizing unit comprises a serially connected voltage stabilizing circuit and an LDO chip, and the LDO chip is connected to the drain of the MOS transistor Q1 via a diode D3.

In an embodiment, the reverse protection circuit is connected in parallel with a diode D1 and a capacitor C1. An anode of the diode D1 is grounded. A cathode of the diode D1 is connected to the power source and the voltage stabilizing unit. The voltage stabilizing unit comprises a serially connected voltage stabilizing circuit and an LDO chip, and the LDO chip is connected to the drain of the MOS transistor Q1 via a diode D3.

In an embodiment, the voltage stabilizing unit is composed of a serially connected voltage stabilizing circuit and a voltage stabilizing chip U3. The radio frequency receiving module is a radio frequency chip U2. A third pin of the radio frequency chip U2 is connected between the voltage stabilizing circuit and the voltage stabilizing chip U3, and an output pin of the radio frequency chip U2 is connected to a signal input pin of the single chip U1.

In an embodiment, the controller further comprises a manual control module. The manual control module comprises a button KEY, and one end of the button KEY is connected to a fourth pin of the single chip U1 while the other end of the button KEY is grounded.

In an embodiment, a resistor R2 and an LED are connected in series between the button KEY and the voltage stabilizing unit. An anode of the LED passes through a resistor R2 to connect between the voltage stabilizing circuit and the voltage stabilizing chip U3, and a cathode of the LED is connected to the button KEY via a resistor R3.

The present disclosure also discloses a power plug comprising the radio frequency-based RGB lamp strip controller above, a housing and a power converter disposed inside the housing. The controller is disposed in the housing, and the power converter is electrically coupled to the controller.

Advantages of the present disclosure include: The radio frequency-based RGB lamp strip controller enables control of the lamp strip by means of radio frequency, and the user can switch between seven monochrome modes and eight colored modes of the lamp strip through a radio frequency terminal. The effective distance of the RF terminal is within 20 meters such that the user can control the controller within a wide range of 20 meters from the controller.

BRIEF DESCRIPTION OF THE DRAWINGS

Embodiments of the present disclosure are described more fully with reference to the accompanying drawings. The drawings are, however, to be construed as illustrative and not restriction.

Reference Labels: 1, input module; 11, reverse protection unit; 12, voltage stabilizing unit; 2, radio frequency receiving module; 3, control module; 4, color adjustment module; 5, manual control module; 21, housing; 22, power converter; 23 controller.

BRIEF DESCRIPTION OF THE DRAWINGS

The concept of the present disclosure will be described below using terms commonly used by those skilled in the art to convey the substance of their work to others skilled in the art. However, these concepts of the disclosure may be embodied in many different forms and should not be construed as limited to the embodiments described herein. These embodiments are provided to make the disclosure more complete and thorough, and to fully convey the scope of the disclosure to those skilled in the art. It should also be noted that these embodiments are not mutually exclusive. Components, steps or elements from one embodiment may be assumed to exist or be used in another embodiment. The particular embodiments shown and described may be substituted for a variety of alternatives and/or equivalent implementations without departing from the scope of the embodiments of the present disclosure. This application is intended to cover any adaptations or variations of the embodiments discussed herein. It will be apparent to those skilled in the art that the alternative embodiments may be practiced using only some of the described aspects. The specific figures, materials, and configurations are described herein for purposes of illustration, and may be practiced by those skilled in the art without the specific details. In other instances, well-known features may be omitted or simplified so as not to obscure the illustrative embodiments.

Moreover, the terms "first," "second," and "third" are used for descriptive purposes only and are not to be construed as indicating or implying relative importance. Unless specifically stated and limited, the terms "provided", "mounted", "connected", and "coupled" are to be understood broadly, and may be, for example, a fixed connection, a detachable connection, or an integral connection; it can be a mechanical connection or an electrical connection; it can be directly connected or indirectly connected through an intermediate medium, which can be the internal connection of the two elements. The term "fixing" may be welding or screwing or snapping. The specific meanings of the above terms in the present disclosure can be understood by those skilled in the art in specific cases.

The USB-powered lamp strip controller according to the present disclosure would be described hereinafter in conjunction with the accompanying drawings and embodiments.

Figure 1:
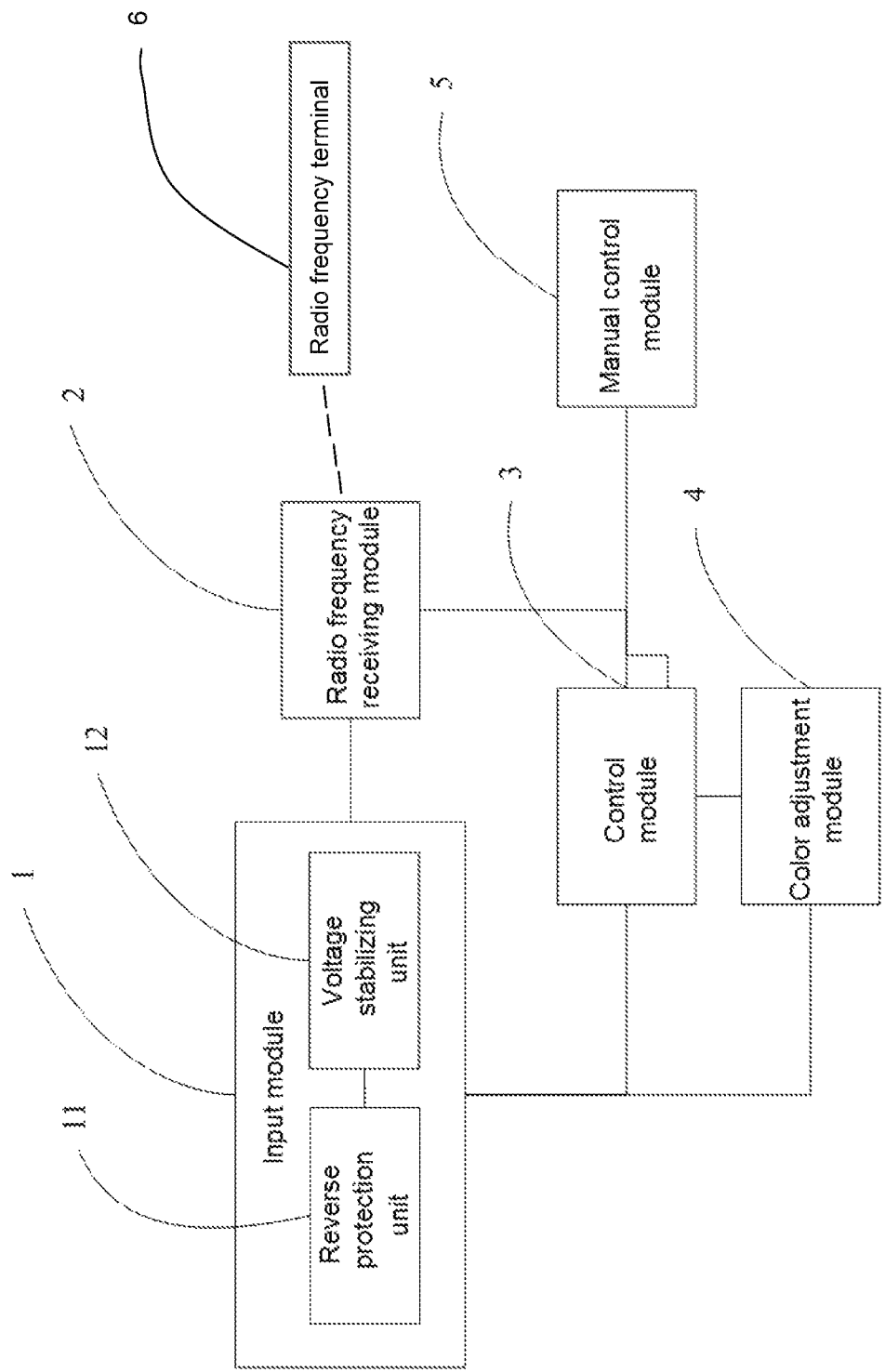
FIG. 1 is a structural block diagram of a radio frequency-based RGB lamp strip controller according to an embodiment.

As shown in FIG. 1, a radio frequency-based KGB lamp strip controller comprises an input end connected to a power source and an output end connected to the lamp strip. Arranged between the input end and the output end are the following components: an input module 1 coupled to the input end for adjusting a power voltage and supplying power to the controller and the lamp strip; a radio frequency receiving module 2 electrically connected to the input module 1 for receiving a radio frequency signal sent by a radio frequency terminal 6; a control module 3 electrically connected to the input module 1 and the radio frequency receiving module 2 for receiving the radio frequency signal to output a control signal; and a color adjustment module 4 electrically connected to the input module 1, the control module 3, and the output end for adjusting a flicker color and a flicker frequency of the lamp strip according to the control signal.

Specifically, in the above-described radio frequency-based RGB lamp strip, the input module 1 is used to adjust the power supply line to provide an effective voltage for the controller and the lamp strip. In the controller, the external signal is mostly received through the radio frequency receiving module 2, and then the control module 3 outputs a corresponding control signal according to the radio frequency signal, and the color adjusting module 4 outputs different voltages according to the control signal to adjust the flicker color and frequency of the lamp strip. In the controller, the radio frequency receiving module 2 performs radio frequency reception from the outside world. The user can directly control the controller through a corresponding radio frequency terminal device and wireless control of the color of the lamp strip is thus enabled.

Figure 2:
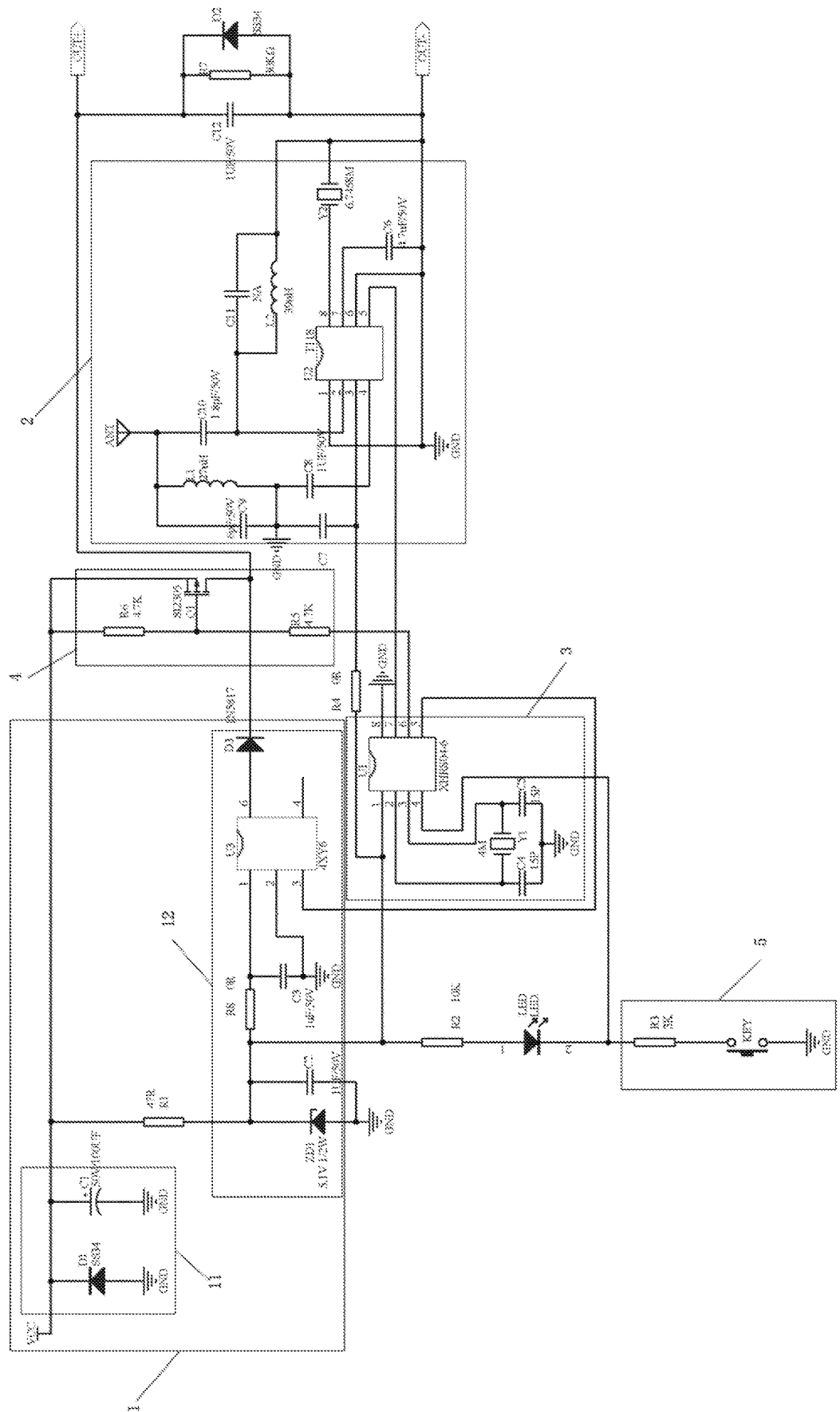
FIG. 2 is a circuit diagram of a radio frequency-based RGB lamp strip controller according to an embodiment.

Further, as shown in FIG. 2, the input module 1 includes a reverse protection unit 11 and a voltage stabilizing unit 12 connected in series. The input end of the reverse protection unit 11 is connected to the power source, and is supplied to the control module 3 and the radio frequency receiving module 2 via the voltage stabilizing unit 12. The reverse protection connection unit 11 includes a diode D1 and a capacitor C1 connected in parallel. The anode of the diode D1 is grounded, and the cathode of the diode D1 is connected to the power source and the voltage stabilizing unit 12. This connection method can lower the power supply voltage when the power supply is reversely connected, and therefore protect both the controller and the lamp strip. The safety and reliability of the controller can be improved.

Further, the voltage stabilizing unit 12 includes a series voltage stabilizing circuit and a voltage stabilizing chip U3. The voltage stabilizing circuit includes a Zener diode ZD1 and a capacitor C2 connected in parallel. The anode of the Zener diode ZD1 is grounded. The voltage regulator chip U3 is an LDO chip, i.e., a linear regulator. A two-stage voltage regulation process is used to ensure the stability of the voltage supplied to the control module 3 and the color adjustment module 4. In addition, a resistor R1 is disposed between the reverse protection connection unit 11 and the voltage stabilizing circuit, and a resistor R8 is further connected in series between the voltage stabilizing circuit and the voltage stabilizing chip U3.

Further, the control module 3 is a single chip U1, and the first pin (VCC pin) of the single chip U1 is connected between the voltage stabilizing circuit and the voltage stabilizing chip U3. The seventh pin (signal receiving pin) of the single chip U1 is electrically connected to the radio frequency receiving module 2 to receive the RF signal transmitted by the RF receiving module 2. In addition, a crystal oscillator circuit is connected between the second pin and the third pin of the single chip U1 to provide a crystal oscillator signal for the single chip U1. In addition, the fifth pin of the single chip U1 is connected to the third pin of the voltage stabilizing chip U3. In an embodiment, the model of the single chip U1 is XHR804-6. Specifically, when the single chip U1 receives the radio frequency signal transmitted from the radio frequency receiving module 2 through the seventh pin, the signal is analyzed to obtain a control signal, and the control signal is input to the color adjustment module 4 through the sixth pin to control the illumination mode of the coupled lamp strip. It is worth noting that the control signals refer to signals of different voltages and frequencies, so when the color adjustment module 4 receives signals of different voltages and frequencies, the voltage and frequency output to the lamp strips may also vary. The color changing of the lamp strip is implemented in this embodiment.

In an embodiment, the RF receiving module 2 is a radio frequency chip 112 electrically connected to the input module 1 and the single chip U1. The third pin (input pin) of the radio frequency chip U2 is connected between the voltage stabilizing circuit and the voltage stabilizing chip U3 to supply power to the radio frequency chip U2, and a resistor R4 is connected in series between the radio frequency chip U2 and the input module 1. The second pin is connected to an antenna, and the RF signal received by the antenna is transmitted to the RF chip U2 through the second pin. The RF chip U2 is also connected in parallel with the two grounded RC circuits. The first RC circuit includes a capacitor C9 and a inductor L1 connected in parallel. The second RC circuit is composed of a capacitor C11 and an inductor L2 connected in series, and a capacitor C10 is disposed between the second RC circuit and the input end of the antenna. In addition, a grounding capacitor C7 is disposed between the third pin of the radio frequency chip U2 and the resistor R4. The fourth pin of the radio frequency chip U2 is grounded through the capacitor C8. The sixth pin of the radio frequency chip U2 is grounded. The seventh pin radio frequency chip U2 is grounded through a capacitor C6. The eighth pin of the radio frequency chip U2 is grounded after passing through the crystal oscillator Y2. In addition, it is worth noting that the fifth pin of the radio frequency chip U2 is an output pin, which is connected to the seventh pin of the single chip U1.

Further, the color adjustment module 4 is a MOS transistor Q1. The gate of the MOS transistor Q1 is connected to the sixth pin (signal output pin) of the single chip U1 and the input end of the power supply. A resistor R6 is connected in series between the gate of the MOS transistor Q1 the output terminal of the reverse protection circuit, and a resistor R5 is disposed between the gate of the MOS transistor Q1 and the sixth pin of the single chip U1. The source of the MOS transistor Q1 is also connected to the output of the reverse protection circuit, and the drain thereof is connected to the lamp strip to supply power to the lamp strip. In addition, the sixth pin of the voltage stabilizing chip U3 is connected to the drain of the MOS transistor Q1 through a diode D3, and the anode of that diode D3 is connected to the sixth pin of the voltage stabilizing chip U2. In an embodiment, when the output voltage of the single chip U1 received by the gate of the MOS transistor Q1 is changed, the drain voltage of the MOS transistor Q1 also changes, and so does the voltage of the lamp strip. Since the different voltages of the lamp strip correspond to different RGB colors, the color of the strip can be adjusted. Furthermore, when the frequency of the output voltage of the single chip U1 is changed, the changing rate of the drain voltage is also changed, and the color changing rate of the light strip varies to generate modes of different colors.

In a further embodiment, the controller further includes a manual control module 5, which includes a button KEY. One end of the button KEY is connected to the fourth pin of the single chip U1, and the other end is grounded. When the user presses the button KEY, each press is equivalent to inputting a control signal once, and the voltage output from the sixth pin of the single chip U1 is changed for one time. The adjustment of the lamp strip can be performed using this mechanism. It is worth noting that, since there are several sets of mode adjustment in the single chip U1, each time the button KEY is pressed to switch from one mode to the next mode, the last set is then cycled to the foremost set to achieve cyclical switching. Pressing and holding the button KEY would turn the controller on or off. This setting approach refers to the combination of manual and automatic mechanisms, and prevents failure of starting or switching the lamp strip when the radio frequency is malfunctioning. In addition, a capacitor C12, a resistor R7 and a diode D2 connected in parallel are also provided at the output. The capacitor C12, the resistor R7 and the diode D2 constitute another reverse protection circuit to prevent the RGB strip from damage caused to the lamp strip by reversely connecting it.

In a further embodiment, a resistor R2, a light-emitting diode LED and a resistor R3 are connected in series between the button KEY and the input module 1. The anode of the LED is connected to the voltage stabilizing circuit and the voltage stabilizing chip U3. When the user activates the timing function through the radio frequency terminal 6, the LED light emits green light. This embodiment can remind the user that the current controller is in the timing function state.

Display of seven monochrome modes and eight multi-color modes in the lamp strip can be realized by the controller. Among them, the monochrome modes include: normal illumination, fade-in, fade-out, blinking, blossom, round trip, fireworks, meteors and flowing, Each of the monochrome modes corresponds to one color, and the seven colors are red, orange (yellow-green), green, blue (blue-green), blue, purple (red-blue), and white (red, green, and blue). The eight modes of color are: six-color jump, six-color gradient, six-color random blinking, RGB blinking, six-color round trip, six-color flicker, rainbow meters and colored band. As the button SW1 is pressed, the controller controls the lamp strip to switch between eight modes which include an automatic cycle, a wave advancement, a double-lamp round trip, single lamp fade-out, flicker round trip, all-lamp flicker, blinking lamp and full illumination. It is worth pointing out that when the illumination intensity of the lamp strip is gradually lowered and repeated repeatedly at a certain period or frequency, a breathing effect of the lamp strip is achieved. In addition, when the lamp strip is illuminated, one or more of the LED lights may suddenly increase in illumination intensity (significantly higher than other LED lights) to enter a jumper pattern. The jumper pattern can be displayed at a certain frequency.

In addition, a matching infrared terminal, such as an infrared remote control, can control the timing of the lamp strip on/off. The usual setting modes include 2H/4H/6H/8H on and off modes.

In the above-mentioned radio frequency-based RGB lamp strip controller, the control of the lamp strip by radio frequency and manual means is realized, and the user can realize the switching of the seven monochrome modes and the eight colors of the lamp strip through a RF terminal at his or her convenience. The effective distance of the RF terminal is within 20 meters such that the user can control the controller within a wide range of 20 meters from the controller.

Figure 3:
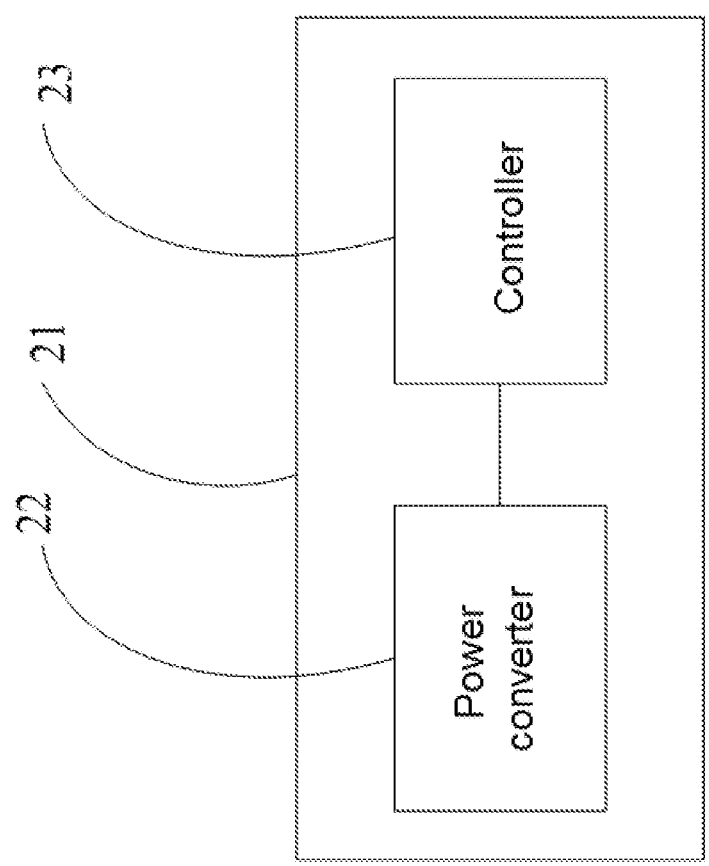
FIG. 3 is a structural block diagram of a power plug according to an embodiment.

A power plug of another embodiment in FIG. 3 comprises the radio frequency-based RGB lamp strip controller discussed above, a housing 21 and a power converter 22 disposed inside the housing 21. The power plug can be directly plugged into a socket to power and control the LED lamp strip.

Various changes and modifications will no doubt become apparent to those skilled in the art. Accordingly, the appended claims are intended to cover all such modifications and changes. The scope and content of any and all equivalents thereof are intended to be within the scope and spirit of the invention.

I claim:

1. A radio frequency-based Red Green Blue (RGB) lamp strip controller, comprising an input end connected to a power source and an output end connected to the lamp strip, wherein arranged between the input end and the output end are:
   an input module coupled to the input end for adjusting a power voltage and supplying power to the controller and the lamp strip;
   a radio frequency receiving module electrically connected to the input module for receiving a radio frequency signal sent by a radio frequency terminal;
   a control module electrically connected to the input module and the radio frequency receiving module for receiving the radio frequency signal to output a control signal; and
   a color adjustment module electrically connected to the input module, the control module, and the lamp strip, for adjusting a flicker color and a flicker frequency of the lamp strip according to the control signal; and wherein
   the input module comprises a serially connected reverse protection unit and a voltage stabilizing unit,
   a gate of the MOS transistor Q1 passes through a resistor R6 to connect to an output terminal of the reverse protection unit,
   an output terminal of the voltage stabilizing unit is connected to a drain of the MOS transistor Q1, the color adjustment module is a MOS transistor Q1,
   the control module is a single-chip U1 connected to the input module and the radio frequency receiving module,
   the gate of the MOS transistor Q1 is connected with a signal output pin of the single-chip U1,
   a source of the MOS transistor Q1 is coupled to the input module, and
   a drain of the MOS transistor Q1 is coupled to the lamp strip as an output terminal.

2. The radio frequency-based RGB lamp strip controller according to claim 1, wherein the reverse protection circuit is connected in parallel with a diode D1 and a capacitor C1, an anode of the diode D1 is grounded, a cathode of the diode D1 is connected to the power source and the voltage stabilizing unit, the voltage stabilizing unit comprises a serially connected voltage stabilizing circuit and a low dropout regulator (LDO) chip, and the LDO chip is connected to the drain of the MOS transistor Q1 via a diode D3.

3. A power plug comprising the radio frequency-based RGB lamp strip controller of claim 2, a housing and a power converter disposed inside the housing, wherein the controller is disposed in the housing, and the power converter is electrically coupled to the controller.

4. The radio frequency-based RGB lamp strip controller according to claim 1, wherein the voltage stabilizing unit is composed of a serially connected voltage stabilizing circuit and a voltage stabilizing chip U3, the radio frequency receiving module is a radio frequency chip U2, a third pin of the radio frequency chip U2 is connected between the voltage stabilizing circuit and the voltage stabilizing chip U3, and an output pin of the radio frequency chip U2 is connected to a signal input pin of the single chip U1.

5. The radio frequency-based RGB lamp strip controller according to claim 4, wherein the controller further comprises a manual control module, the manual control module comprises a button KEY, and one end of the button KEY is connected to a fourth pin of the single chip U1 while the other end of the button KEY is grounded.

6. The radio frequency-based RGB lamp strip controller according to claim 5, wherein a resistor R2 and an LED are connected in series between the button KEY and the voltage stabilizing unit, an anode of the LED passes through a resistor R2 to connect between the voltage stabilizing circuit and the voltage stabilizing chip U3, and a cathode of the LED is connected to the button KEY via a resistor R3.

7. A power plug comprising the radio frequency-based RGB lamp strip controller of claim 6, a housing and a power converter disposed inside the housing, wherein the controller is disposed in the housing, and the power converter is electrically coupled to the controller.

8. A power plug comprising the radio frequency-based RGB lamp strip controller of claim 5, a housing and a power converter disposed inside the housing, wherein the controller is disposed in the housing, and the power converter is electrically coupled to the controller.

9. A power plug comprising the radio frequency-based RGB lamp strip controller of claim 4, a housing and a power converter disposed inside the housing, wherein the controller is disposed in the housing, and the power converter is electrically coupled to the controller.

10. A power plug comprising the radio frequency-based RGB lamp strip controller of claim 1, a housing and a power converter disposed inside the housing, wherein the controller is disposed in the housing, and the power converter is electrically coupled to the controller.

11. A power plug comprising the radio frequency-based RGB lamp strip controller of claim 1, a housing and a power converter disposed inside the housing, wherein the controller is disposed in the housing, and the power converter is electrically coupled to the controller.

* * * * *